US012651518B2

(12) United States Patent
Fiorentino

(10) Patent No.: US 12,651,518 B2
(45) Date of Patent: Jun. 9, 2026

(54) SYSTEM AND METHOD FOR DETERMINING THE APPROACH OF AN OBJECT

(71) Applicant: COMM3000 S.P.A., Milan (IT)

(72) Inventor: Marco Fiorentino, Milan (IT)

(73) Assignee: COMM3000 S.P.A., Milan (IT)

(*) Notice: Subject to any disclaimer, the term of this patent is extended or adjusted under 35 U.S.C. 154(b) by 15 days.

(21) Appl. No.: 19/042,103

(22) Filed: Jan. 31, 2025

(65) Prior Publication Data

US 2025/0252836 A1 Aug. 7, 2025

(30) Foreign Application Priority Data

Feb. 2, 2024 (IT) ........................ 102024000002265

(51) Int. Cl.
*G08B 21/02* (2006.01)
*G08B 21/18* (2006.01)

(52) U.S. Cl.
CPC ........... *G08B 21/02* (2013.01); *G08B 21/182* (2013.01)

(58) Field of Classification Search
CPC ...... G08B 21/02; G08B 21/182; G08G 1/005; G08G 1/165; G08G 1/166; G06V 20/52; G06V 20/58
See application file for complete search history.

(56) References Cited

U.S. PATENT DOCUMENTS 6,420,993 B1 * 7/2002 Varon .................... G08G 5/723 342/36
8,214,087 B2 * 7/2012 Samukawa ....... B60W 30/0956 701/1
11,041,947 B2 * 6/2021 Degani .................... G01S 13/70
2009/0195371 A1 8/2009 Camus
2012/0116663 A1 5/2012 Tsunekawa
2013/0219592 A1 * 8/2013 McCrady ............... A42B 3/046 2/410
2016/0332059 A1 11/2016 Seeff
2017/0188129 A1 6/2017 Sindia et al.
(Continued)

FOREIGN PATENT DOCUMENTS

EP 3279830 A1 2/2018
KR 1020200080869 A 7/2020

OTHER PUBLICATIONS

Italian Search Report and Written Opinion issued on Sep. 3, 2024, in corresponding Italian Patent Application No. 202400002265; 9 pages.

*Primary Examiner* — Nay Tun
(74) *Attorney, Agent, or Firm* — Maier & Maier, PLLC

(57) ABSTRACT

A system adapted to identify the approach of an object. The system is adapted to: detect at least one object in space, provide an estimate of the distance between the at least one object detected and the system, and provide a time instant in which the at least one object is detected. The system defines a plurality of information sets, each information set referring to a time instant and a number of objects detected at the time instant, and including a distance from the device of each of the detected objects, the distances being ordered in a sequence according to a predetermined criterion, identifies pairs of information sets referring to different time instants but associated with the same number of detected objects. Further, the system generates an alarm signal if a change in distance or speed exceed a limit value.

12 Claims, 6 Drawing Sheets

(56) References Cited

U.S. PATENT DOCUMENTS

| | | | | |
|---|---|---|---|---|
| 2019/0049968 | A1* | 2/2019 | Dean | A61G 5/04 |
| 2019/0171215 | A1* | 6/2019 | Tatourian | B60W 30/0956 |
| 2021/0219095 | A1* | 7/2021 | Iyer | H04W 4/023 |

* cited by examiner 21 22 23 24 25 26

| Timestamp ts | Object type Ob | Number of objects type Ob detected NdOt | Distance Z | Coordinate Xc | Coordinate Yc |
|---|---|---|---|---|---|
| $t_0$ | 1 | 3 | $D_{0,1}$ | $X_{0,1}$ | $Y_{0,1}$ |
| $t_0$ | 1 | 3 | $D_{0,2}$ | $X_{0,2}$ | $Y_{0,2}$ |
| $t_0$ | 1 | 3 | $D_{0,3}$ | $X_{0,3}$ | $Y_{0,3}$ |
| ... | .... | ... | .... | ... | ... |
| ... | ... | ... | ... | ... | ... |
| $t_{-1}$ | 1 | 3 | $D_{-1,1}$ | $X_{-1,1}$ | $Y_{-1,1}$ |
| $t_{-1}$ | 1 | 3 | $D_{-1,2}$ | $X_{-1,2}$ | $Y_{-1,2}$ |
| $t_{-1}$ | 1 | 3 | $D_{-1,3}$ | $X_{-1,3}$ | $Y_{-1,3}$ |
| ... | ... | ... | ... | ... | ... |
| ... | ... | ... | ... | ... | ... |
| ... | ... | ... | ... | ... | ... |

$g_1$ (rows 1–3), $g_2$ (rows 6–8)

Fig.5

20

SYSTEM AND METHOD FOR DETERMINING THE APPROACH OF AN OBJECT

TECHNICAL FIELD

The present invention refers to the field of image processing in order to evaluate the distance, in particular a change in distance, of one or more objects framed by a system. The invention finds particular application in anti-collision systems, and in particular in the systems intended to warn a user, for example a skier, a cyclist or a motorcyclist that one or more objects outside the user's field of vision are dangerously approaching, and provide information to the user in order to avoid potential impacts.

BACKGROUND

Nowadays, anti-collision systems are becoming increasingly popular, particularly in the automotive sector—where cars are equipped with numerous sensors capable of periodically detecting objects in the space surrounding the car. For example, the anti-collision system analyses frames acquired by cameras on board the vehicle in order to identify framed objects and determine their distance. Anti-collision systems typically comprise object tracking functionalities that assign a unique ID to each object detected in a frame and are able to track each of these objects in the subsequent frames, in order to determine their possible approach and assist the driver in avoiding collision with the objects identified and tracked over time.

However, the object tracking algorithms are recursive and require high computational capacity that grows exponentially as the number of objects increases.

In order to alleviate this problem, for example US 2009/0195371 and EP 3279830 describe anti-collision systems that determine the distance of an object identified in an image by means of a tracking algorithm. The system uses simplified pre-processing techniques—compared to traditional object tracking algorithms—to start safety measures to mitigate the risk of collision in the automotive sector.

Although the known systems guarantee a certain effectiveness in avoiding collisions, these systems still require a rather high computational capacity. In order to ensure adequate response times, therefore, high-performance hardware resources are necessary.

The hardware instrumentation used in the automotive sector, where there are no major restrictions in terms of space and electrical consumption, cannot be used in portable applications and/or applied on different vehicles—for example, bicycles, motorcycles, etc. In addition, the major limitations imposed on the hardware and energy resources of the system in the case of portable applications and/or on vehicles other than a car make the object tracking software excessively complex to run or cause a reduction in performance (in particular, response times) that may render the system unsuitable for the purpose of collision prevention.

The need is therefore felt for a reliable anti-collision system with limited response times that, at the same time, does not require high computational capacity and does not require high electrical consumption.

A need is also felt for a system that can warn a user of the impact danger immediately, intuitively and in such a way that a useful action can be taken in a timely manner to avoid the impact.

SUMMARY

An object of the present invention is to overcome the drawbacks of the prior art.

In particular, it is an object of the present invention to provide a system and a method capable of robustly and reliably identifying at least one object approaching the system itself, in particular one or more objects that might collide with the system and a user thereof.

It is a further object of the present invention to provide a system and a method capable of informing a user of the possibility of collision with at least one object, approaching the system and the user him-/herself.

Furthermore, it is an object of the present invention to provide a system and a method adapted to give indications relating to the distance, relative position and speed of at least one approaching object, in particular an excessive approach, in an intuitive and immediate manner, so that the user can promptly perform a evasive manoeuvre, without distracting the user from performing an activity.

It is a further object of the present invention to provide a system and method that is not harmful to health, in particular that is not based on potentially harmful electromagnetic radiations, for example radar waves or laser light.

Furthermore, it is an object of the present invention to provide a system that is portable, preferably wearable, that is lightweight, not cumbersome and that requires little electrical energy for operation.

These and other objects of the present invention are achieved by a method and a relative system incorporating the features of the attached claims, which form an integral part of the present description.

According to a first aspect, the present invention is directed to a system adapted to signal an approach of at least one object from the system, in particular to signal at least one object at risk of collision with the system. In particular, the system is adapted to detect at least one object in space, provide an estimate of the distance between the at least one object detected and the system itself, and provide a time instant in which the at least one object is detected.

To avoid the use of recursive object tracking algorithms, the system defines a plurality of information sets. In particular, each information set refers to a time instant and a number of objects detected at the time instant. Furthermore, the information set comprises a measurement or an estimate of the distance from the device of each of the detected objects. Advantageously, the distances are ordered in a sequence according to a predetermined criterion.

The system identifies pairs of information sets referring to different time instants but associated with the same number of detected objects. For each pair of information sets thus identified, the system determines at least one change in distance by comparing at least one pair of distances having the same position in the sequence of distances of the respective information set.

Alternatively, the system determines at least one speed by comparing two distances having the same position in the sequence of distances of the respective information set and the difference of times between the two time instants to which the two information sets refer.

If the change in distance or speed exceeds a limit value, it generates an alarm signal to signal an approach of the object, in particular a possible collision with the approaching object.

In one embodiment, the system comprises at least one camera and a processing device connected to the camera. In particular, in the present description the term "camera" indicates a device capable of generating, or acquiring, with a predetermined periodicity a digital image of a portion of space framed by the camera. In other words, the camera is capable of acquiring a sequence of images over time.

The camera periodically acquires an image, which is received by the processing device that executes an image processing algorithm. Through the algorithm, the processing device, for each image acquired, determines a plurality of data comprising:

a typology to which each object portrayed in the image belongs, a distance of each object portrayed by the camera, and an instant of image acquisition time.

Advantageously, the processing device first defines a plurality of information sets. In particular, each information set refers to a time instant and a number of objects of the same typology. In a non-limiting way, referring to the case of image acquisition by means of a camera, with an information set "referred" or "associated" to a time instant and a number of objects of the same typology, an information set is indicated, comprising data relating to a group of objects all belonging to the same typology of object (e.g., human being, bicycle, tree, etc.) extracted from an image acquired at a predetermined time instant. Furthermore, the information set comprises an estimate of the distance from the camera of each of said objects of the same typology. These distances are ordered in a sequence according to a predetermined criterion—for example, in ascending or descending order. The processing device, therefore, identifies pairs of information sets referring to different time instants, but associated with, i.e. comprising, the same number of objects of the same typology. For each pair of information sets, the processing device determines at least one change in distance by comparing distances having the same position in the respective sequence of the information sets of the pair and estimates an approach speed calculated from a pair of object distances which is associated with the information sets based on the determined change in distance and the time difference among the time instants of the two information sets of the pair of information sets.

If the approach speed and/or distance decrease is greater than a threshold value, the processing device generates an alarm signal.

The system according to the present invention is thus able to detect objects approaching to the camera—or other detection device—and the relative user carrying the system or a device/apparatus/vehicle transporting or integrating the system, effectively by means of extremely limited hardware resources. In particular, the system does not run recursive object tracking algorithms that require considerable processing resources which, moreover, increase exponentially with the increase in the number of detected objects. In other words, the system according to the present invention is much faster and more responsive than similar systems based on a recursive analysis of a plurality of images acquired by means of one or more cameras or other known techniques.

Recursive object tracking algorithms are no longer necessary precisely thanks to the procedure of comparing the distance of pairs of the same numbers of objects over time, the complexity of which increases linearly and not exponentially with the increase in the number of objects. In doing so, the possible exchange of objects (which could take place in specific cases when, for example, in two frames with the same number of objects, a fifth object advances until it swaps order with a fourth detected object) does not affect the purpose of determining whether there is an approach for the purposes of avoiding collisions. For example, if the fourth object is approaching and the fifth was approaching even faster, it overtakes it and becomes the fourth, the system still detects two objects approaching and by how much, it does not matter that the two objects have "swapped" the position. This is instead not possible if the number of objects in the two different moments of time is not the same, as it would be impossible to determine which pairs of distances to analyse and which object or which objects to discard in order to determine dangerous approaches without using iterative object tracking algorithms.

Unlike object tracking systems, the objects entering the scene or exiting therefrom involves a moment in which the system is not able to determine reductions in the distance in order to avoid collisions. For example, when the number of objects increases from five to six it is not possible to determine which pairs of distances to compare among the five objects of one frame and the six of the other frame. However, the speed of execution of the algorithm is such that in a moment very close to the entry of the sixth object one will have a second information set comprising six distances and so on, ordering according to the same criterion the two sets of six distances and by comparing the pairs so ordered it will then again be possible to determine if there are changes in distance and if these highlight a dangerous situation.

In an embodiment that further reduces the incidence of the phenomenon just described, the system identifies a typology to which each detected object belongs (e.g. cars, buses, motorcycles), and defines the plurality of information sets so that each information set refers to the same number of objects of the same typology.

Thanks to this expedient, it is possible to obtain greater precision and reliability of the system because the entry or exit of an object of one typology would temporarily affect determining the change in distance only for that typology of object but not for other typologies of objects present. The increase in complexity of the system to implement this expedient is little and linear.

However, in another embodiment the system ignores differences between a part of the object categories.

In one embodiment, the system comprises at least one camera adapted to acquire a plurality of images, and a processor adapted to detect at least one object portrayed in at least one acquired image and to provide an estimate of the distance of the object portrayed by the camera.

The system thus composed is extremely lightweight and versatile, consequently, it can be easily implemented as a portable system or integrated into technical/sports equipment (for example, a ski helmet) or items of clothing.

In one embodiment, the system identifies pairs of information sets in the manner described below.

First, it selects a first information set referring to the first time instant, and identifying a second information set referring to the same number of objects to which the first information set refers, and to a second time instant. Advantageously, the second time instant is the previous time instant closest to the first time instant among the time instants referring to the information sets.

Thanks to this operating mode, the system is able to quickly evaluate the presence of objects that are actually approaching with an extremely limited number of operations.

In one embodiment, the system creates a data structure comprising the plurality of information sets. In this case, the information sets are ordered in the data structure by decreasing time instant and so that in each information set the distances are ordered according to an increasing distance criterion from the system.

Thanks to this organization of information, it is possible to make comparisons between distances and therefore identify approaching objects with an extremely low computational cost.

Preferably, the information sets are ordered so that information sets referring to the same number of objects are adjacent to each other within the data structure.

Even more preferably, the data structure is a table in which in each row comprises:

an entry indicative of the time instant in which an object is detected, an entry indicative of the number of detected objects in that time instant, and an entry indicative of the distance of the object detected in that time instant.

Each information set comprises at least one table row.

Advantageously, the system compares two distances comprised in two different rows of the table comprising the same number of objects detected at different time instants. In particular, the two different rows occupy a corresponding position between the rows of the table comprised in the respective information set.

Advantageously, although not in a limiting manner, each table row comprises an entry indicative of the typology of objects identified. In this case, the entry indicative of the number of objects refers to the number of that type of relevant object at that moment in time. In this case, the system compares two distances comprised in two different rows of the table comprising the same number of objects of the same typology detected at different time instants, where the two different rows occupy a corresponding position between the rows of the table comprised in the respective information set.

The organization of the information sets extracted from the acquired images performed by the system makes it possible to simplify the operations necessary to identify the data to be compared with each other, increasing the speed of data processing and, in general, the speed of reaction of the system to a change in the data examined.

In one embodiment, the processing device determines, for each image, a bounding box enclosing each recognized portrayed object, and determines a position of each portrayed object in the image with respect to a two-dimensional reference system based on the bounding box—for example, the centre of the bounding box of each identified object is found.

In one embodiment, when for example an approach speed greater than the threshold value is detected, the processing device determines a relative position of the object associated with said approach speed based on the respective position, and generates an alarm signal comprising information on the position from which the object associated with said approach speed approaches the camera.

In one embodiment, the alarm signal comprises at least an indication of the calculated distance and/or the calculated distance and/or speed change. Preferably the system comprises an acoustic signal generation module for generating the alarm signal as an acoustic signal, at least stereophonic, the volume of which has an intensity and directionality indicative of the distance of the object with respect to the system, and a tone of the acoustic signal indicative of the change in calculated distance or calculated speed.

The system according to the present invention allows to warn a user of a possible collision in a simple and intuitive way, without the user having to look away from a current direction of observation (for example, the advancing direction of the user).

In one embodiment, the camera of the system is mounted on the user's head/helmet, and the system comprises a playback module coupled to or placed near the user's ears. In this case, the audio alarm signal comprises an indication of the approach speed of the approaching object and/or an indication of the distance between the camera and the approaching object. Preferably the alarm signal is an at least stereophonic acoustic signal adapted to provide the user with a three-dimensional positioning indication indicative of the position of the object with respect to the camera, i.e. with respect to the user's head.

The system according to the present invention transmits to the user in an effective and easily intelligible manner an amount of information about the approaching object with respect to the orientation of the user's head and the origin of the approaching objects at that moment so that he/she can instinctively take a dodged action.

A different aspect of the present invention concerns a method of signalling the approach of an object, in particular a possible collision with an object, by means of an electronic system. The method comprises estimating a distance between at least one object detected by the system and the system itself and a time instant in which the at least one object is detected.

Advantageously, the Method Comprises:

defining a plurality of information sets, each information set referring to a time instant and a number of objects detected at the time instant, and comprising a distance from the device of each of the detected objects, the distances being ordered in a sequence according to a predetermined criterion, identifying pairs of information sets referring to different time instants but associated with the same number of detected objects, for each pair of information sets, it determines at least one change in distance by comparing two distances having the same position in the sequence of distances of the respective information set, or it determines at least one speed by comparing two distances having the same position in the sequence of distances of the respective information set and the time difference between the two time instants to which the two information sets refer, and if the change in distance or the speed exceeds a limit value, generating an alarm signal.

The method according to the present invention allows to obtain advantages corresponding to those set forth for the system in its various embodiments presented above.

Further features and purposes of the present invention will become more evident from the description below.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate.

FIG. 5 is a table of information extracted from the analysed frames which is used in the procedure of FIG. 4.

DETAILED DESCRIPTION OF THE EMBODIMENTS

Some preferred embodiments will be described in detail below, although the invention is susceptible to various alternative modifications. It must in any case be understood that there is no intention to limit the invention to the specific embodiment illustrated, but, on the contrary, the invention intends covering all the modifications and equivalents that fall within the scope of the invention as defined in the claims.

Unless otherwise defined, all the terms of the art, notations and other scientific terms used herein are intended to have the meanings commonly understood by those who are skilled in the art to which this description pertains. In some cases, terms with commonly understood meanings are defined herein for the sake of clarity and/or for ease of reference; the inclusion of such definitions in the present description should thus not be interpreted as representing a substantial difference from what is generally understood in the art.

The terms “comprising”, “having”, “including” and “containing” are to be understood as open-ended terms (i.e. the meaning of “comprising, but not limited to”) and are to be considered as a support also for terms like “consist essentially of”, “consisting essentially of”, “consist of” or “consisting of”.

The use of “for example”, “etc.”, “of” indicates non-exclusive alternatives without limitation, unless otherwise indicated. The use of “includes” means “includes, but not limited to” unless otherwise indicated.

Figure 1:
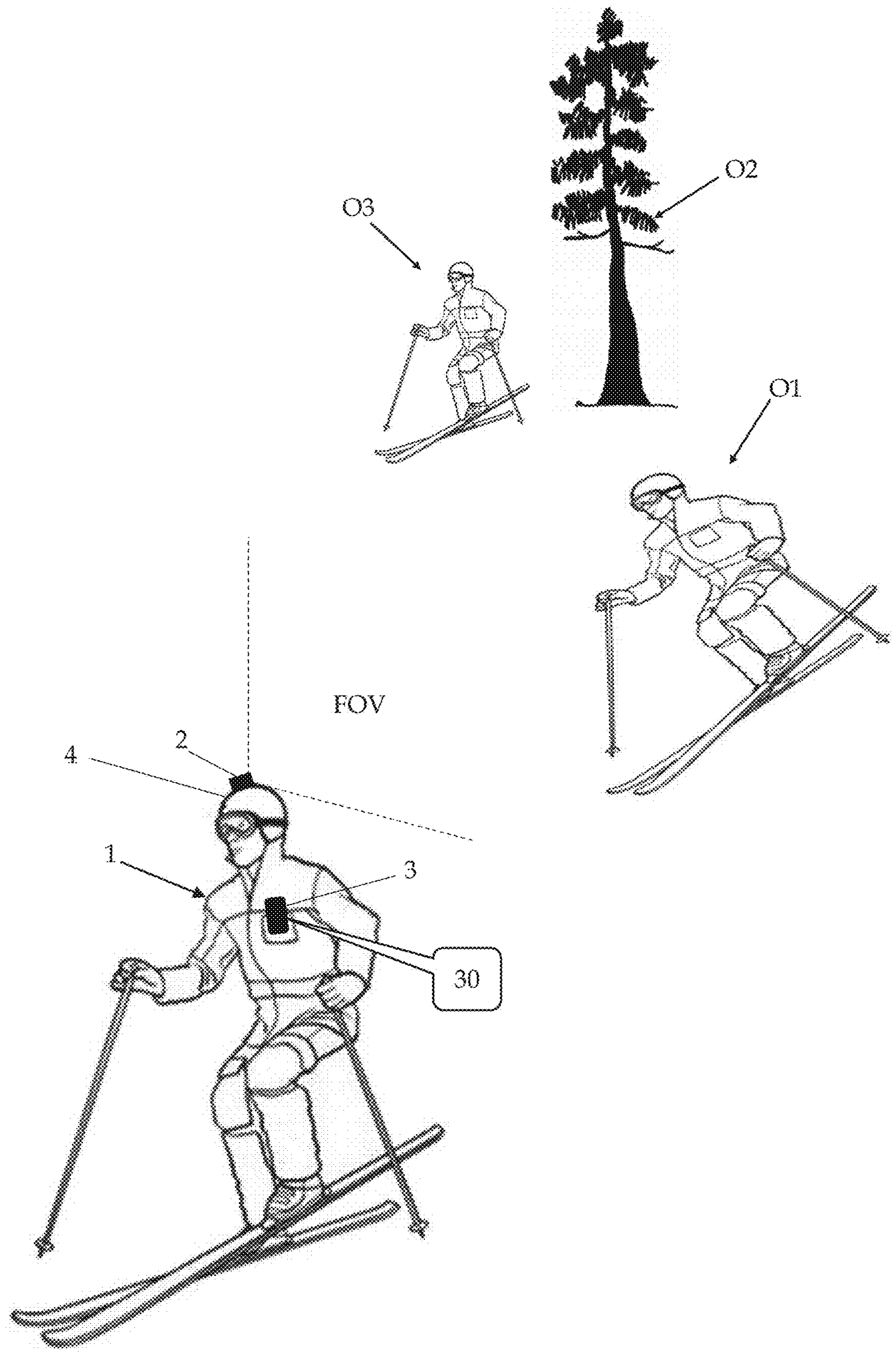
FIG. 1 is a schematic representation of a system according to an embodiment of the present invention used in skiing.

FIG. 1 shows a skier 1 equipped with a camera 2 and with a portable device 3, such as a smartphone, on which there is installed a software application 30 (hereinafter app) able to dialogue with the camera 2 and to process the images acquired by the camera. In an alternative embodiment (not illustrated), the camera 2 and the portable device 3 are comprised in a single element and/or are integrated into the helmet worn by the skier 1, as well as any acoustic sound playback devices, typically positioned at the two ears of the user.

In a known manner, the camera 2 acquires a series of image frames and transmits them to the portable device 3.

In the embodiment considered, the camera 2 is installed so as to capture a portion of space, i.e. to have a field of view FOV, not visible to the skier 1. For example, the camera 2 is fixed on a helmet 4 and positioned to frame the space behind the skier 1. Alternatively, the camera 2 may be fixed on another element, for example an item of clothing, such as a jacket of the skier 1.

The portable device 3 then runs the app 30 which implements an anti-collision method capable of signalling one or more objects—e.g., other skiers who are approaching the skier 1.

In a preferred embodiment, the anti-collision method is activated autonomously by the app 30 by analysing data provided by sensors (not illustrated) on board of the portable device 3. For example, the app 30 is configured to start the anti-collision method when an analysis of the data provided by at least one sensor on board of the portable device 3 indicates a change in position compatible with a predetermined movement, for example a movement compatible with a ski descent. In this way, it is possible to reduce electrical consumption and avoid false alarms when the skier 1 is not skiing.

Figure 2:
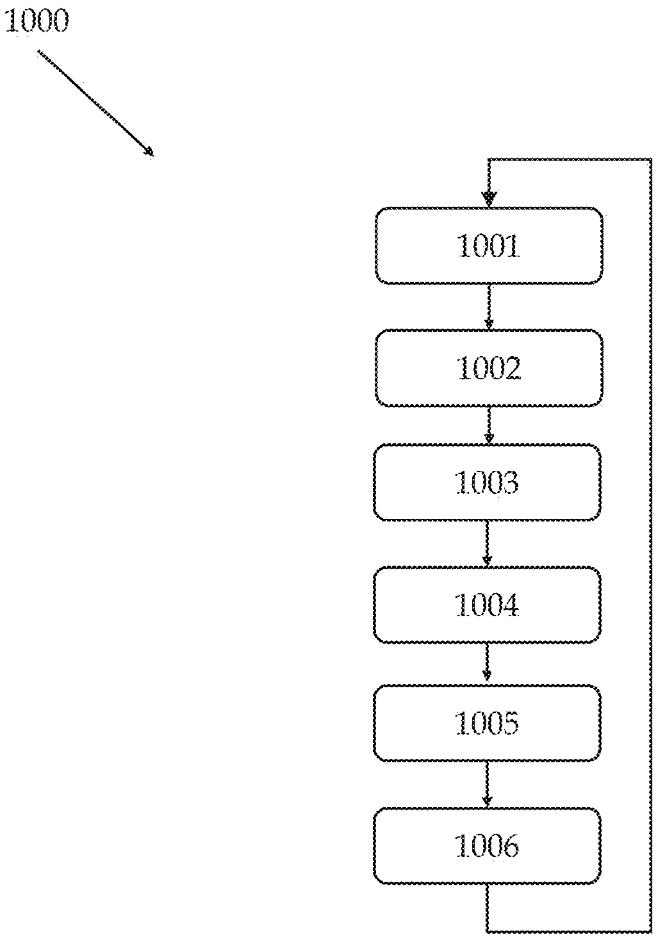
FIG. 2 is a flowchart of an image processing procedure.
Figure 4:
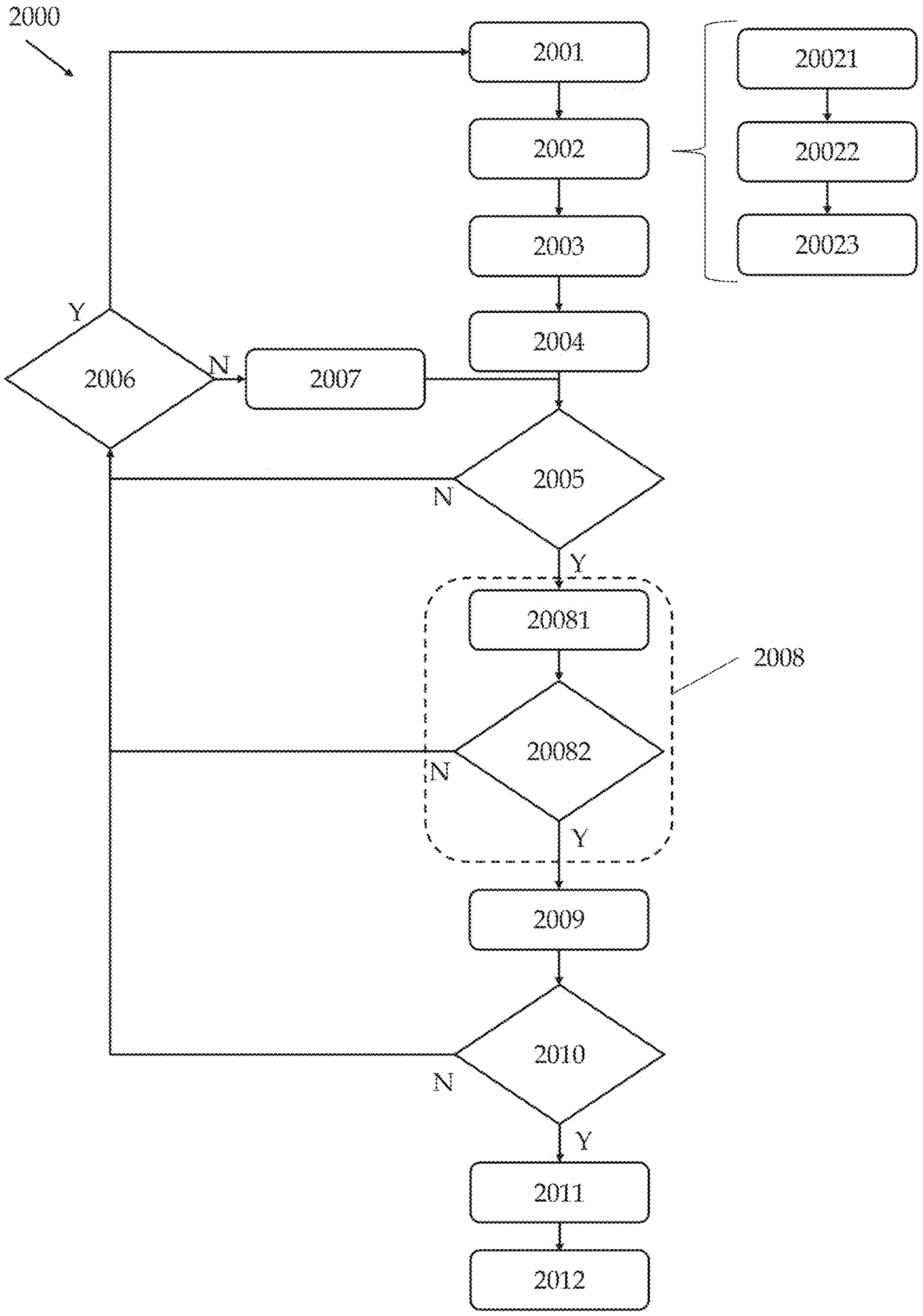
FIG. 4 is a flow diagram of an anti-collision procedure according to an embodiment of the present invention.

The anti-collision method according to embodiments of the present invention comprises, in a non-limiting manner, an image processing procedure 1000, described below with reference to the flowchart of FIG. 2, and an approach detection procedure 2000, described below with reference to FIG. 4.

Figure 3A:
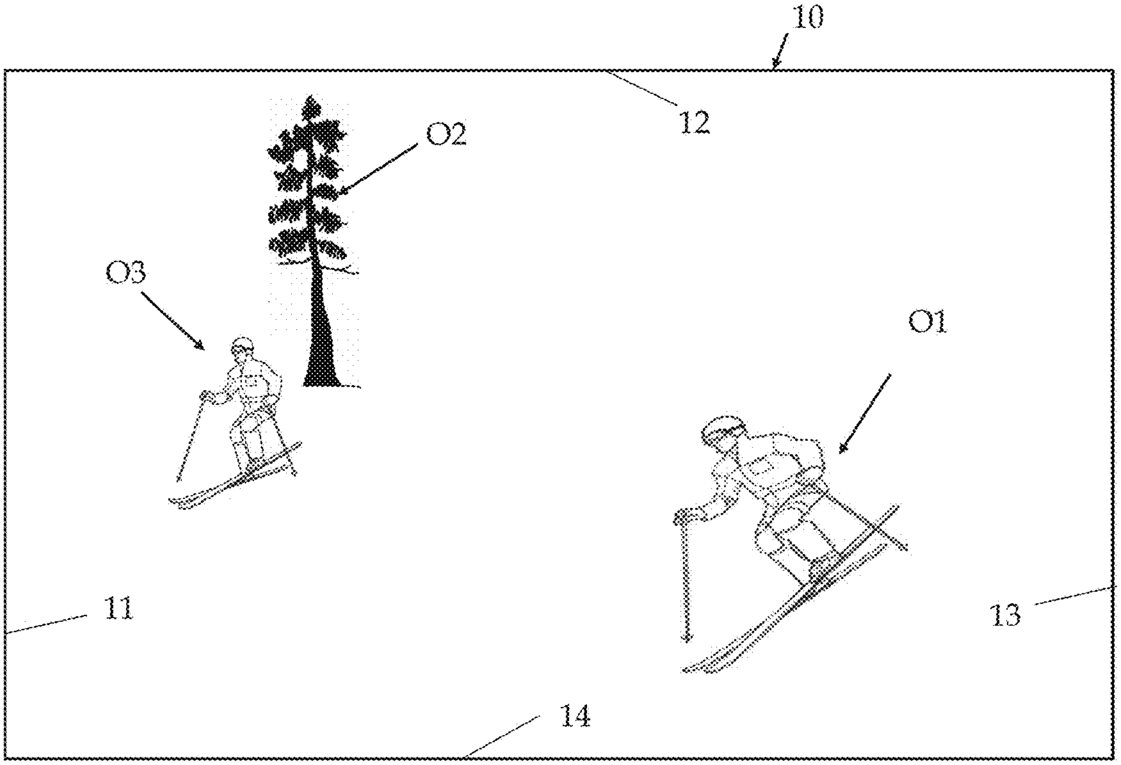
FIG. 3A is a schematic representation of a frame acquired by a camera of the system of FIG. 1.

The procedure 1000 is adapted to identify one or more objects O1-O3 depicted in each frame 10—schematically illustrated in FIG. 3A—acquired by the camera 2 and to provide an estimate of a distance between each object O1-O3 detected and the camera 2 that acquired the frame 10.

Each frame 10 generated by the camera 2 is received by the portable device 3 (step 1001) and is associated with a corresponding timestamp ts (step 1002). For example, the timestamp ts is contained in the metadata of the frame 10 generated by the camera 2 or it is determined by the portable device 3 upon receipt of the frame 10.

The frame 10 is processed to identify the presence of one or more objects depicted in the frame 10 (step 1003). For example, the processing of the frames 10 is performed by an object recognition algorithm based on artificial intelligence. Preferably, the algorithm is a convolutional neural network (CNN), for example of the fast R-CNN or faster R-CNN type. In a non-limiting embodiment, the artificial intelligence algorithm is trained to recognize images using a generic dataset such as COCO 2017 that still comprises people (skiers) or vehicles, or datasets specific to the field of use.

Figure 3B:
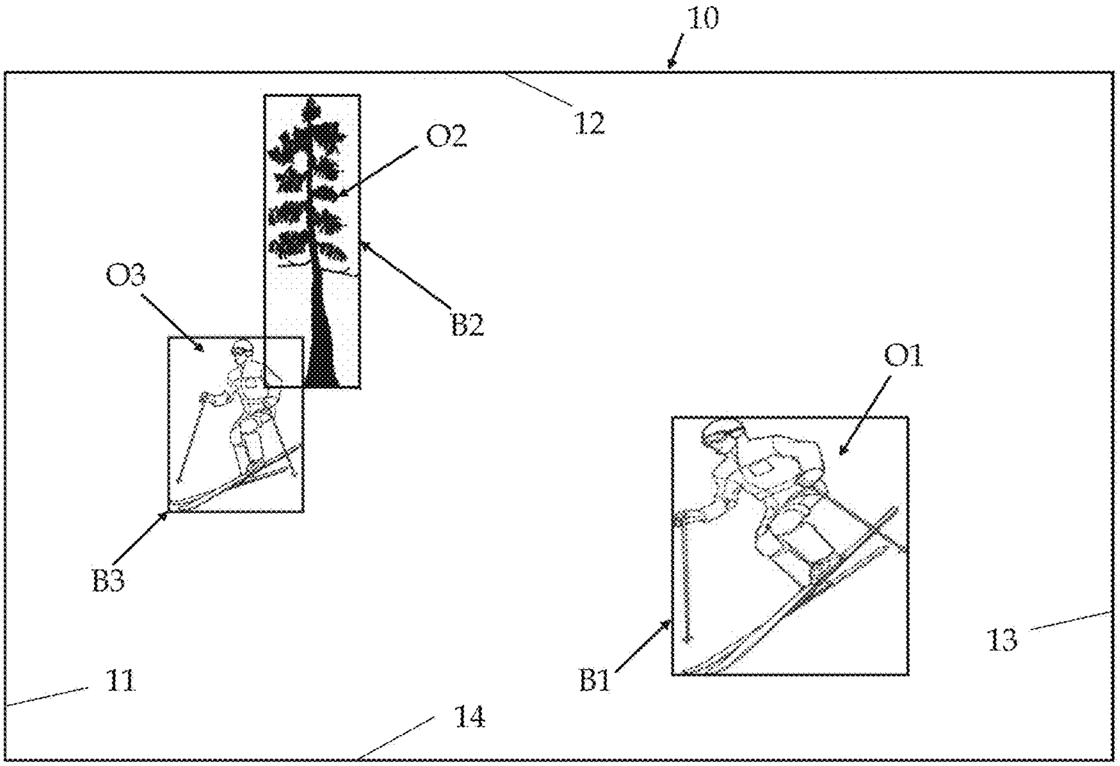
FIG. 3B corresponds to the frame of FIG. 3A in which bounding boxes identified by the system of FIG. 1 are indicated.

A set of object information is determined for each identified object O1-O3 (step 1004). In the embodiment considered, the set of object information comprises:

- i). a typology of the identified object (e.g., human being, tree, car, bicycle, etc.) among those contemplated in the data set,
- ii). a bounding box B1-B3, i.e. the quadrilateral of minimum dimensions within which all points, i.e. pixels, representing the identified object are contained, as schematically shown in FIG. 3B, typically described through four variables: coordinates X and Y (e.g., in pixels) of a predetermined angle (e.g., coordinates of the upper left angle) and width L and height A and
- iii). optionally, a confidence value of the performed identification (e.g., a percentage value from 0% to 100%).

Subsequently, an estimate of the distance Z1-Z3 between each object O1-O3 identified and the camera 2 that acquired the frame 10 is performed (step 1005). In particular, in the case of a single camera, an estimation algorithm is run which uses information of the camera 2—for example, focal length, resolution, aperture, etc.—and the object information determined in the previous step. In the embodiment considered, the estimate of the distance Z1-Z3 of each O1-O3 from the camera 2 is based on the dimension of the diagonal of the bounding box B1-B3 calculated from the dimensions acquired at step 1004 which is compared with a plurality of sample diagonals calculated from frames representing objects of the same typology as the object O1-O3 considered at different distances. In the case of two cameras, the distance of each object can be measured thanks to parallax analysis.

Figure 3C:
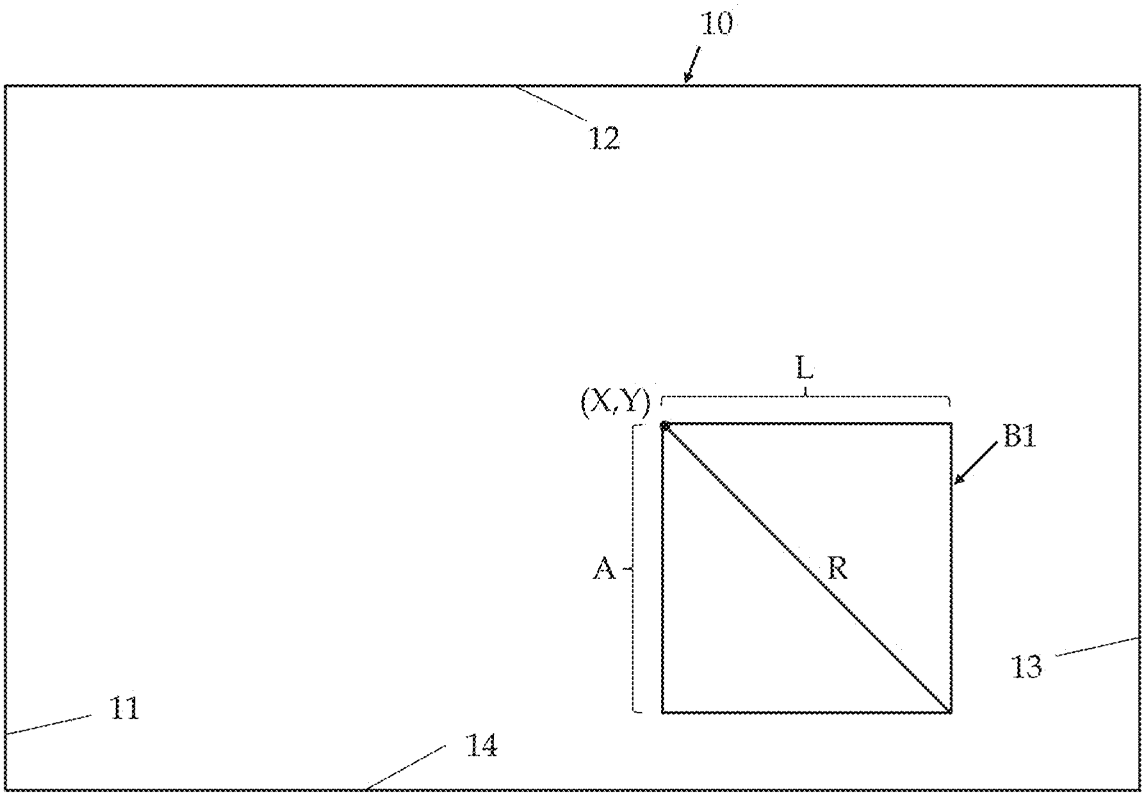
FIG. 3C is a graphical representation in principle of the information calculated for a bounding box identified by the system of FIG. 1.

Once the analysis of the objects O1-O3 comprised in the frame 10 has been completed, a set of output data, hereinafter simply referred to as IO output, relating to the analysed frame 10 is generated (step 1006). In the example considered, the IO output comprises the following data:

i). the timestamp ts associated with the analysed frame 10, and for each object O1-O3 considered:

ii). the identified typology of object, iii). coordinates X and Y of a pixel of the frame 10 corresponding to a predetermined angle of the bounding box (for example, the upper left angle as shown in FIG. 3C) where the coordinate X indicates a position of the pixel in the width direction of the frame 10 while the coordinate Y indicates a position of the pixel in the height direction of the frame 10, iv). a width value, hereinafter simply referred to as width L, corresponding to the width of the bounding box B1-B3 (e.g., measured in pixels), v). a height value, hereinafter simply referred to as height A, corresponding to the height of the bounding box B1-B3 (e.g., measured in pixels), and vi). the distance Z.

The procedure 1000 is reiterated by step 1001 to analyse a new frame 10 provided by the camera 2. In general, the procedure 1000 is reiterated until frames 10 are received from the camera 2.

The approach detection procedure 2000—uses the IO outputs provided by the procedure 1000 to identify one or more of the objects O1-O3 (excessively) approaching the skier 1 and to signal in advance this danger to the same skier so that the latter can perform an evasive manoeuvre to avoid a collision with such objects. In embodiments of the present invention, the procedure 2000 performs a prediction of one or more possible collisions between the user 1 (wearing the camera 2) and one of the objects O1-O3 based on the analysis of the IO outputs relating to a sequence of frames 10 generated by the camera 2 in a predetermined maximum time interval Δt ranging from the current time instant $t_A$ to an earlier time instant $t_P$ (i.e., $t_A>t_P$).

At a high level, the procedure 2000 comprises comparing the IO outputs of the frames 10 referring to time instants comprised in the time interval Δt in which the same number of objects O1-O3 of the same typology have been detected. Subsequently, the approach speed of the objects identified is calculated by comparing pairs of objects of the same typology O1-O3 in different frames 10, preferably starting from the object closest to the camera 2—that is, to the skier 1—at most far in each frame 10 considered. Finally, the objects O1-O3 with an approach speed greater than a threshold value are identified as dangerous and an alarm signal—intelligible to the skier 1—is generated through the portable device 3. Preferably, the alarm signal provides indications to the skier 1 about the position of the dangerous object O1-O3 (in relation to his/her head, on which the camera is mounted), so that he/she can intuitively perform a "evasive" manoeuvre that allows avoiding collision. In a possible form of implementation, the most recent frame with respect to the current one where the same number of objects O1-O3 of the same typology have been detected is considered.

In more detail, the relative IO outputs provided by the procedure 1000 are processed (step 2001). In particular, based on the coordinates X,Y, length L, height A of each object O1-O3 in each frame 10, the coordinates Xc and Yc of the centre of each bounding box B1-B3 are calculated. The "centre" of the bounding box B1-B3 means the geometric point of intersection of the medians or diagonals of the bounding box B1-B3. Preferably, Xc and Yc are null (zero) at the centre of the frame 10—in other words, the origin of the x,y coordinate system is located at the centre of frame 10.

The following data are therefore grouped, preferably per identified typology of object: timestamp ts, the coordinates Xc and Yc of the bounding boxes B1-B3, the distance Z, the typology and number of objects type O1-O3 identified in each frame 10 (step 2002). Preferably, the IO output data is stored in a data structure, for example a table 20, according to an organization schematically represented in FIG. 5.

Table 20 comprises the following columns: a timestamp column 21, which reports the timestamp ts associated with the frame 10 to which the remaining data reported in the same row refer, a typology column 22 (Ob), which reports an identification code of the typology of object O1-O3 identified (e.g., number 1 for people, 2 for trees, etc.), an object number column 23 (NdOt) which reports the number of objects O1-O3 belonging to the typology indicated in the typology column 22 (Ob) detected in the same timestamp ts reported in column 21 (i.e. in the same frame 10), a distance column Z 24, in which the distance Z1-Z3 of one of the objects O1-O3 of the typology indicated in the corresponding column 22 is reported, an X-coordinate column 25 and a Y column 26, in which the coordinates Xc and Yc of the bounding box B1-B3 relating to the object O1-O3 associated with the distance Z in column 24 are reported.

The rows of the table 20 are populated according to criteria of time, typology of object and distance. In detail, the rows are ordered by decreasing time instant, i.e. from the data associated with the most recent timestamps ts (up to the current time instant $t_A$) to the data associated with the oldest timestamp ts (from the current time instant $t_L$) (sub-step 20021). In addition, the rows are populated so that objects O1-O3 of the same typology are adjacent to each other (sub-step 20022). Finally, for each typology of object, the rows are ordered in order of increasing distance Z from the camera 2 (that is, from the object O1-O3 closest to the furthest object O1-O3) (sub-step 20023). Consequently, the table 20 comprises groups of adjacent rows relating to the same number of objects (i.e., same value NdOt in the object number column 23) of the same typology (i.e., same Ob value in the column typology 22) identified at the same time (i.e., same time value in the timestamp column 21). In other words, these groups of rows form information sets referring to a number of objects of the same typology and associated with the same time instant.

Subsequently, the data relating to objects O1-O3 outside the time interval Δt are deleted (step 2003). In other words, the data relating to time instants prior to a time instant limit $t_L=t_A-\Delta t$ are deleted.

In order to predict the approach of an object, for example to predict a possible collision with the object, the stored data are then processed. In particular, a first group $g_1$ of rows is selected—relating to the same number of objects NdOt of the same typology Ob and referring to the same time instant ts, in the embodiment considered equal to the current time instant (step 2004), i.e. to the data just obtained from procedure 1000. In the example of FIG. 5, the first group of rows $g_1$ comprises 3 rows referring to NdOt=3 objects of type Ob=1 (e.g., human beings) detected in the frame 10 associated with the current timestamp (i.e. the last frame acquired and processed) $ts=t_0$. Each row of the first group $g_1$ comprises a respective object-camera distance $Z=D_{0.1}$, $D_{0.2}$ and $D_{0.3}$ and respective central coordinates $X_C$ and $Y_C$: $X_{0.1}$, $Y_{0.1}$, $X_{0.2}$, $Y_{0.2}$ and $X_{0.3}$, $Y_{0.3}$ of bounding box. Thanks to the populating criteria of table 20 set forth above, the first row of the group selected for the same typology of object O1-O3 corresponds to the row containing information about the object of the common typology of the first group $g_1$ considered closest to the camera 2—, for example to the skier 1 (i.e., $D_{0.1}<D_{0.2}<D_{0.3}$ in the example of FIG. 5).

Table 20 is analysed to identify a second group $g_2$ of rows relative to the same number of objects O1-O3 of the same typology of object Ob indicated in column 22 and comprising the same number of objects NdOt indicated in column 24 of the first group $g_1$, but with value of timestamp ts in the column 21 that is less recent—i.e. information relating to a previous frame 10 (decision step 2005). Preferably, the second group $g_2$ is selected as the group closest in time to the first group $g_1$ of selected rows—that is, information extracted from frames 10 acquired in the time instants that are as close as possible to one another is considered. In the example of FIG. 5, the second group of rows $g_2$ comprises 3 rows referring to NdOt=3 objects of type Ob=1 (i.e., like the first group $g_1$) detected in the frame associated with the timestamp $ts=t_1$ (prior to the timestamp to of the first group $g_1$); each row of the second group $g_2$ comprises a respective object-camera distance $Z=D_{-1.1}$, $D_{-1.2}$ and $D_{-1.3}$ and respective coordinates $X_C$ and $Y_C$: $X_{-1.1}$, $Y_{-1.1}$, $X_{-1.2}$, $Y_{-1.2}$ and $X_{-1.3}$, $Y_{-1.3}$ of bounding box centre.

If a second group of rows with the sought characteristics is not identified (output branch N of step 2005), the procedure 2000 verifies whether all the typologies of object Ob present in the table 20 have been considered (decision step 2006) and in the negative case (output branch N of step 2006), a new first group relating to a different typology of object Ob associated with a value of timestamp ts in the timestamp column 21 corresponding (in the embodiment considered) or closer to the current time instant (step 2007) is considered and a new second group with similar characteristics (i.e., same Ob and NdOt values), but temporally anterior (i.e., timestamp ts anterior to the timestamp ts of the first group) is sought (i.e., the method returns to step 2005). On the contrary, if all typologies of object Ob recorded in the table 20 (output branch Y of step 2006) have been considered, the procedure is reiterated from step 2001 using new OI outputs provided by the procedure 1000.

On the contrary, when the second group $g_2$ of rows is identified (output branch Y of step 2005), a comparison is performed between the values of the distances recorded in the rows of the two groups $g_1$ and $g_2$ (step 2008) which, let us recall, are ordered with the same criterion. In the embodiments, the value of distance Z of each row of the first group $g_1$ is compared with the value of distance Z of a corresponding row of the second group $g_2$—i.e. having the same position in the respective group. In detail, referring to the example of FIG. 5, the first row of the second group $g_2$ is selected for comparison with the first row of the first group $g_1$, the second row of the second group $g_2$ is selected for comparison with the second row of the first group $g_1$, and the third row of the second group $g_2$ is selected for comparison with the third row of the first group $g_1$ (sub-step 20081). The values of distance Z recorded in the entries of the Z-distance column 24 of each pair of selected rows of the two groups $g_1$ and $g_2$ are compared (decision sub-step 20082). In particular, the comparison between each pair of distances comprises verifying whether there is a distance reduction greater than a threshold value $\Delta Z_{th}$. For example, it is verified whether the difference between the distance recorded in the first row of the second group $g_2$ and the distance recorded in the first row of the first group $g_1$ is higher than a threshold value (i.e., $\Delta Z=D_{-1.1}-D_{0.1}\geq\Delta Z_{th}$).

If a decrease in the distance Z greater than the threshold value is not detected for any pair of rows (output branch N of step 20082), the procedure 2000 proceeds with step 2006 (described above) to verify whether all the typologies of object Ob present in the table 20 have been considered.

Otherwise, for each comparison between rows of the two groups $g_1$ and $g_2$ that identifies a decrease in the distance $\Delta Z$ greater than the threshold value $\Delta Z_{th}$ (output branch Y of step 20082), the (approach) speed of the corresponding object O1-O3 is estimated. In the case considered, the speed estimate is calculated as the ratio between the change in the distance $\Delta Z$—that is, the difference of the values of distance Z recorded in the column 25 of the two rows considered—over time—that is, the difference between the values of timestamp ts recorded in the column 22 of the two rows considered (step 2009). Referring to the example in FIG. 5, if the comparison of the distances recorded in the first rows of the two groups $g_1$ and $g_2$ indicates the threshold value being exceeded, the speed v is estimated as $v=\Delta Z/\Delta t=(D_{-1.1}-D_{0.1})/(t_0-t_1)$.

Each estimate of the speed v calculated is compared with a threshold speed $v_{th}$ (decision step 2010). If all the calculated speed estimates are lower than the threshold value $v_{th}$ (output branch N of step 2010), no object of the first group $g_1$ is currently considered dangerous for the skier 1 and the operation is reiterated from step 2006 (described above) to verify whether all the typologies of object Ob present in the table 20 have been considered.

On the contrary, for each estimate of the speed v equal to or higher than the threshold value $v_{th}$ (output branch Y of step 2010), at least one object O1-O3 of the first group $g_1$ is considered dangerous for the skier 1, i.e. a collision risk is identified (step 2011), and a corresponding alarm signal is generated to inform the skier 1 of the risk of an imminent collision (step 2012). Advantageously, the alarm signal comprises collision information allowing the skier 1 to understand position, distance and speed of the approaching object O1-O3 and thus perform an evasive manoeuvre to avoid the collision without the skier actively identifying the approaching object O1-O3.

In the embodiments of the present invention, the collision information is determined on at least the basis of the coordinates Xc, Yc of the bounding box B1-B3, the value of distance Z reported in the row of the first group $g_1$ for which a speed v higher than the threshold value $v_{th}$ was determined, as well as on the estimate of the calculated speed v and finally the distance Z in absolute terms.

Preferably, the alarm signal is generated by the portable device 3 as an acoustic signal emitted directly by the portable device 3 or by a playback device—for example, Bluetooth headphones—connected in a wired or wireless manner to the portable device 3.

For example, the alarm signal provides the collision information through a stereophonic sound using tones with frequency as a function of the speed v of the approaching object O1-O3, a general volume defined by an inverse function (e.g., inversely proportional) to the distance between the skier 1 and the object O1-O3, and a right/left volume as a direct function of the coordinate Xc of the approaching object O1-O3—in particular, such as to cause a possible collision, and optionally, of the three-dimensional positioning of the object as a function of the coordinates Xc and/or Yc of the approaching object O1-O3. In summary, the collision information is a three-dimensional acoustic signal, the volume of which has an intensity and directionality indicative of the distance and position of the object O1-O3 with respect to the camera 2 and, therefore, to the skier 1. At the same time, the tone of the collision information is indicative of the displacement speed of the object O1-O3. Advantageously, although not in a limiting manner, changes in frequency or intermittency of the sound may be correlated to the absolute distance of the object O1-O3.

For example, the evasive information is obtained by modulating the acoustic signal as described in Gonzilez-Mora, J. L., Rodríguez-Hernández, A., Rodríguez-Ramos, L. F., Díaz-Saco, L., Sosa, N. (1999) "*Development of a New Space Perception System for Blind People, Based on the Creation of a Virtual Acoustic Space*" Engineering Applications of Bio-Inspired Artificial Neural Networks, IWANN 1999, Lecture Notes in Computer Science, vol 1607, Springer, Berlin, Heidelberg.

Subsequently, the procedure 2000 is reiterated from step 2001 as long as the skier 1 continues the activity.

However, it is clear that the above examples must not be interpreted in a limiting sense and the invention thus conceived is susceptible of numerous modifications and changes.

In general, it will be apparent to the skilled person that the system and the procedures according to the embodiments described above are not limited to the scope of skiing activities. On the contrary, the system and the procedures described above can also be used to increase safety in other activities such as cycling, motorcycling and other similar activities.

It will also be apparent to the skilled person that the system may comprise more than one camera, for example two cameras. In the case of systems with multiple cameras, the distance can be calculated thanks to parallax analysis. In other embodiments, the position and typology of object is determined, in addition to or as an alternative to one or more cameras, by means of at least one sensor comprised among: LIDAR, Radar and the like.

In addition, one or more steps of the same procedure 1000, or 2000 and/or of two of the procedures described above—e.g., 1000 and 2000—may be performed in parallel with each other or in a different order from that presented above. Similarly, one or more optional steps may be added or removed from one or more of the above described procedures.

In other embodiments, the estimate of the distance between the object and the camera is carried out by means of a different technique with respect to what is described above. In a non-limiting way, the estimation algorithm can be configured to use a different measurable quantity of the object considered, for example the dimensions of the respective bounding box, the area of the bounding box, the number of pixels contained in the bounding box or a combination thereof. For example, in an embodiment with greater computational/energy consumption, a segmentation of the identified object within each bounding box is performed and then the pixels representing the object are counted. The distance is estimated by means of a formula whereby the distance is inversely proportional to the number of pixels of the object. In a simpler alternative embodiment, the distance between object and camera is estimated based on the dimensions of the bounding box area; again, the distance is inversely proportional to the dimensions of the bounding box area. In general, the estimation algorithm can be of any typology both based on the analysis of images from a single camera and on the analysis of pairs of images comprising the same object obtained from two cameras substantially at the same time instant.

In one embodiment, the approach detection procedure after determining a change in distance by comparing two selected distances (at step 2008) does not calculate the relative speed of the objects. On the contrary, the procedure verifies whether the change in distance exceeds a limit value and in the affirmative case, considers that the object associated with the change in distance is (excessively) approaching the camera, causing the generation of an alarm signal in a manner similar to what is described above (from step 2011 onwards).

In this way it is possible to identify an object at risk of collision with a smaller number of calculations. In this case, preferably, the images—or more generally the information about the objects within the range of the sensor(s) that is/are used are acquired with a known period.

In a simplified embodiment, the approach detection procedure is based solely on estimated distance, time instant of acquisition, and number of objects detected at the time instant. In other words, information on the typology of the detected objects is not used. In this embodiment, information sets referring to a time instant and to a number of detected objects are created, regardless of the typology of such objects. Consequently, distances belonging to information sets having the same number of detected objects at different time instants, typically consecutive time instants, are then compared.

In addition or alternatively, the information about the relative position of the object may be omitted. In this case, the alarm signal will not provide indication of the direction of approach of the approaching object.

In an alternative embodiment, the approach detection prediction procedure comprises not considering the objects that are at an estimated distance greater than a threshold distance. In other words, the procedure disregards objects that are too far away from the camera to constitute an actual danger for the user. For example, the threshold distance is defined based on an assumed maximum speed of the identified object. Alternatively, the procedure comprises not considering objects with a speed higher than the threshold speed value, but at a distance higher than a limit value, possibly a dynamic one determined based on the estimated speed of the object itself.

In one embodiment (not illustrated), the approach detection procedure comprises the use of one or more counters combined with each other to define a hysteresis value. For example, each row in the table comprises a hysteresis entry in which a hysteresis value is stored. The hysteresis value can be changed based on counters which in turn are increased when a speed higher than the threshold value is detected and otherwise decreased, optionally also considering the number of successive considered movements of the object approaching or moving away to/from the camera. Preferably the hysteresis value of a row corresponds to the hysteresis values of the row associated with a previous time instant with which it is compared increased or decreased based on the processing described above. In this case the alarm signal is generated only when the hysteresis value exceeds a corresponding threshold value.

In an embodiment of the present invention, the approach detection procedure comprises storing—for example, in a memory of the portable device—one or more frames acquired by the camera, when an object is detected at a distance from the camera less than a threshold distance and/or the decrease in the distance of the closest object between the current frame and a less recent one exceeds a threshold value.

In a different embodiment, the system is configured to temporarily store a plurality of frames acquired by the camera—i.e., the frames are stored for a predetermined period of time, after which they are deleted. In this case, when an object is detected at a distance from the camera smaller than a threshold distance, a number of previous frames and a number of frames subsequent to the time instant at which the approach minus the threshold distance is determined are stored for long-term storage. In addition or alternatively, the frame storage just described may be provided if the approach speed of an object and/or the change in distance increases above a respective threshold.

As a further addition or alternative, the system may be configured to detect an actual collision between the user of the device and an object. For example, the collision may be detected by analysing the frames provided by the camera and/or from the data provided by sensors on board the portable device, such as one or more accelerometers and/or magnetometers. In this case, the system may be configured to associate with a collision event the frames stored at and/or prior to a collision detection and/or associate stored frames for which no collision is detected with a near-collision event. Optionally, the system may be configured to discard stored frames not associated with a collision event.

In other embodiments, the portable devices of a plurality of skiers (or motorcyclists, cyclists) communicate to a central server the respective position and, optionally, the speed (determined for example by an on-board GPS module), optionally in the case of the skier his/her altitude above sea level—amsl (determined by GPS and/or by a barometer) and the speed relative to the skier 1 of the various detected objects (even those moving away). In this embodiment, several skiers equipped with the portable device, possibly even if without a camera, positioned downstream or forward of the direction of travel are alerted that one or more objects are proceeding at high speed behind them before they even enter the field of view of the camera of the system.

In general, the procedures described above form an anti-collision method, capable of identifying one or more approaching objects and, therefore, in a possible path of collision with a user and of signalling to the user the direction and the speed of approach of the object in a timely manner.

Naturally, all the details can be replaced with other technically-equivalent elements.

For example, although reference has been made in the description to a system comprising a camera and a portable device, nothing precludes realizing the system as a single monolithic device or providing a different processing device—such as a dedicated processing device.

In addition or as an alternative to generating an acoustic signal, nothing prevents from providing the alarm signal in graphic form, for example by projecting symbols on an augmented reality headset worn by the user (for example, integrated into a helmet worn by the user).

In conclusion, the materials used, as well as the shapes and contingent dimensions of the devices, apparatus and terminals mentioned above, may be any according to the specific implementation needs without thereby departing from the scope of protection of the following claims.

The invention claimed is:

1. A system to signal an approach of at least one object, the system adapted to: detect at least one object in space, provide an estimate of the distance between the at least one object detected and the system, and provide an instant of time in which the at least one object is detected, wherein the system:

defines a plurality of information sets, each information set referring to an instant of time and a number of objects detected at said instant of time, and includes a distance from a device of each of the detected objects, the distances being ordered in a sequence according to a predetermined criterion, identifies pairs of information sets referring to different instants of time but associated with the same number of detected objects, for each pair of information sets, determines at least one change in distance by comparing two distances having the same position in the sequence of distances of the respective information set, or determines at least one speed by comparing two distances having the same position in the sequence of distances of the respective information set and the two instants of time to which the two information sets refer, and when the change in distance or speed exceeds a limit value or the distance is less than a limit, generates an alarm signal.

2. The system according to claim 1, further adapted to identify a typology to which each detected object belongs, and to define the plurality of information sets so that each information set refers to the same number of objects of the same typology.

3. The system according to claim 1, further comprising at least one camera adapted to acquire a plurality of images, and a processor adapted to detect the at least one object portrayed in at least one acquired image and to provide an estimate of the distance of the object portrayed by the camera.

4. The system according to claim 1, further adapted to identify pairs of information sets by:

selecting a first information set referring to the first instant of time, and identifying a second set of reported information:

to the same number of objects to which the first information set refers, and to a second instant of time, where the second instant of time is the previous instant of time closest to the first instant of time among the instants of time referring to the information sets.

5. The system according to claim 1, further adapted to create the data structure so that the information sets are ordered by decreasing instant of time, and so that in each information set the distances are ordered according to an increasing distance criterion from the system.

6. The system according to claim 5, further adapted to create a data structure comprising the plurality of information sets, wherein the information sets are ordered so that information sets referring to the same number of objects are adjacent to each other within the data structure.

7. The system according to claim 6, wherein the data structure is a table comprising a row for each of the objects detected at the same instant of time, and each row comprises:

an entry indicative of the instant of time in which an object is detected, an entry indicative of the number of objects detected in the instant of time, an entry indicative of the distance of the respective detected object, and wherein each information set comprises at least one table row, and wherein the system compares two distances comprised in two different rows of the table including the same number of objects detected at different instants of time, each of the two rows belonging to a respective information set and occupying a corresponding position between the table rows comprised in the respective information set.

8. The system according to claim 6, wherein the data structure is a table comprising a row for each of the objects detected at the same instant of time, where each row comprises:

an entry indicative of the instant of time in which an object is detected, an entry indicative of a type of object detected at the instant of time, an entry indicative of the total number of objects of said type detected in the instant of time, an entry indicative of the distance of the detected object, and wherein each information set comprises at least one table row, and wherein the system compares two distances comprised in two different rows of the table including the same number of objects of the same type detected at different instants of time, where the two different rows occupy a corresponding position between the rows of the table comprised in the respective information set.

9. The system according to claim 1, wherein the alarm signal comprises at least an indication of the change of calculated distance or calculated speed, and wherein the system further comprises an acoustic signal generation module for generating the alarm signal as an acoustic signal, at least stereophonic, the volume of which has an intensity, a directionality and a tone indicative of the distance of the object with respect to the system and/or the change in calculated distance or calculated speed.

10. The system according to claim 1, wherein the system is further adapted to estimate a position in space of each detected object relative to the system, and wherein the system includes in the alarm signal information relating to the direction of approach of one or more possible objects.

11. The system according to claim 1, wherein the device is adapted to count a number of consecutive distance or speed change comparisons that exceed the limit value, wherein said comparisons relate to distances having the same positions in information sets referring to the same number of objects detected in consecutive instants of time, change the number of comparisons each time a consecutive distance or speed change comparison does not exceed the limit value, and delay the generation of the alarm signal until the number of comparisons reaches a predetermined value.

12. A method of signalling an approach of at least one object by an electronic system, the method including steps of estimating a distance between at least one object detected by the system and the system itself, and an instant of time in which at least one object is detected, the method comprising the steps of:

defining a plurality of information sets, each information set referring to an instant of time and a number of objects detected at said instant of time, and including a distance from the device of each of the detected objects, the distances being ordered in a sequence according to a predetermined criterion, identifying pairs of information sets referring to different instants of time but associated with the same number of detected objects, for each pair of information sets, determines at least one change in distance by comparing two distances having the same position in the sequence of distances of the respective information set, or determines at least one speed by comparing two distances having the same position in the sequence of distances of the respective information set and the two instants of time to which the two information sets refer, and when the change in distance or speed exceeds a limit value, generating an alarm signal.

* * * * *